US012558632B2

(12) United States Patent
Gao

(10) Patent No.: US 12,558,632 B2
(45) Date of Patent: Feb. 24, 2026

(54) DATA PROCESSING METHOD AND APPARATUS, DEVICE AND STORAGE MEDIUM

(71) Applicant: BEIJING BYTEDANCE NETWORK TECHNOLOGY CO., LTD., Beijing (CN)

(72) Inventor: Siyu Gao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 18/250,698

(22) PCT Filed: Sep. 9, 2021

(86) PCT No.: PCT/CN2021/117352
§ 371 (c)(1),
(2) Date: Apr. 26, 2023

(87) PCT Pub. No.: WO2022/089028
PCT Pub. Date: May 5, 2022

(65) Prior Publication Data
US 2023/0405479 A1 Dec. 21, 2023

(30) Foreign Application Priority Data
Oct. 26, 2020 (CN) .......................... 202011156661.5

(51) Int. Cl.
*A63F 13/86* (2014.01)
*A63F 13/52* (2014.01)
*H04N 21/2187* (2011.01)

(52) U.S. Cl.
CPC .............. *A63F 13/86* (2014.09); *A63F 13/52* (2014.09); *H04N 21/2187* (2013.01)

(58) Field of Classification Search
CPC ........ A63F 13/86; A63F 13/52; A63F 13/355; A63F 13/5252; A63F 13/87; A63F 13/60;
(Continued)

(56) References Cited

U.S. PATENT DOCUMENTS 11,076,197 B1 * 7/2021 Salehomoum ..... H04N 21/4307
2012/0277001 A1 * 11/2012 Lansdale ................. A63F 13/44
463/39
(Continued)

FOREIGN PATENT DOCUMENTS

| CN | 105306468 A | 2/2016 |
|---|---|---|
| CN | 105491393 A | 4/2016 |

(Continued)

OTHER PUBLICATIONS

First Office Action issued Dec. 10, 2021 for CN Application No. 202011156661.5, English Translation (12 pages).
(Continued)

*Primary Examiner* — Michael A Cuff

(57) ABSTRACT

Provided are a data processing method and apparatus, a device and a storage medium. The method includes: acquiring a first live streaming video stream of a first live streaming user and a second live streaming video stream of a second live streaming user; merging the first live streaming video stream and the second live streaming video stream into a game video stream; and sending the game video stream to a viewing user to live stream a target game.

14 Claims, 6 Drawing Sheets

(58) Field of Classification Search
CPC ........... H04N 21/2187; H04N 21/4781; H04N 21/23424; H04N 21/25866; H04N 21/4312; H04N 21/44016; H04N 21/4508; H04N 21/4756; H04N 21/4788
USPC .......................................................... 463/31
See application file for complete search history.

(56) References Cited

U.S. PATENT DOCUMENTS

| | | | |
|---|---|---|---|
| 2015/0163562 A1 | 6/2015 | Leventhal et al. | |
| 2017/0011771 A1* | 1/2017 | Kim ...................... | G11B 27/031 |
| 2017/0304735 A1* | 10/2017 | Shang ................ | H04N 21/4316 |
| 2018/0035145 A1 | 2/2018 | Grubbs et al. | |
| 2023/0067099 A1* | 3/2023 | Tang .................... | H04L 67/131 |

FOREIGN PATENT DOCUMENTS

| | | | | |
|---|---|---|---|---|
| CN | 106162221 A | | 11/2016 | |
| CN | 106954100 A | * | 7/2017 | ......... H04N 21/6405 |
| CN | 108076349 A | | 5/2018 | |
| CN | 108769824 A | | 11/2018 | |
| CN | 108900859 A | | 11/2018 | |
| CN | 109011574 A | | 12/2018 | |
| CN | 109173272 A | | 1/2019 | |
| CN | 109327709 A | | 2/2019 | |
| CN | 110213601 A | | 9/2019 | |
| CN | 110300311 A | | 10/2019 | |
| CN | 111314720 A | | 6/2020 | |
| CN | 111526406 A | | 8/2020 | |
| CN | 111698567 A | | 9/2020 | |
| CN | 111729294 A | | 10/2020 | |
| CN | 111787015 A | | 10/2020 | |
| CN | 111818359 A | | 10/2020 | |
| CN | 112291579 A | | 1/2021 | |

OTHER PUBLICATIONS

Second Office Action issued Jul. 29, 2022 for CN Application No. 202011156661.5, English Translation (14 pages).
Third Office Action issued Jul. 29, 2022 for CN Application No. 202011156661.5, English Translation (14 pages).
Search Report mailed Nov. 30, 2021 in PCT/CN2021/117352, English Translation (6 pages).
Supplementary Search Report issued Jul. 26, 2023 for Chinese Application No. 202011156661.5, English Translation (5 pages).
Office Action for Chinese Application No. 202011156661.5, mailed on Nov. 1, 2024, 16 pages.
Written Opinion for International Application No. PCT/CN2021/117352, mailed Nov. 30, 2021, 9 Pages.

* cited by examiner

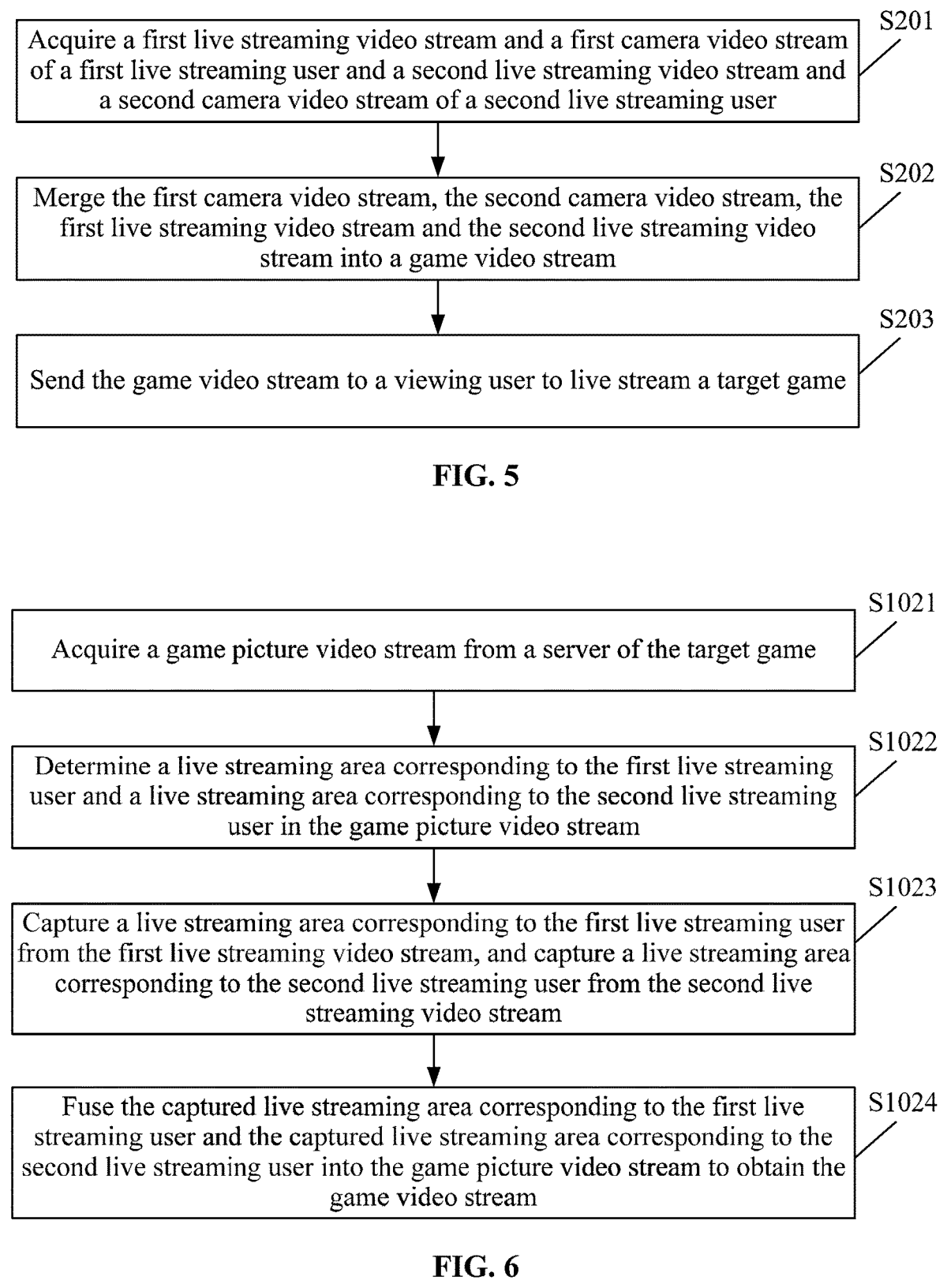

S201

Acquire a first live streaming video stream and a first camera video stream of a first live streaming user and a second live streaming video stream and a second camera video stream of a second live streaming user

S202

Merge the first camera video stream, the second camera video stream, the first live streaming video stream and the second live streaming video stream into a game video stream

S203

Send the game video stream to a viewing user to live stream a target game

Acquire a game picture video stream from a server of the target game

S1022

Determine a live streaming area corresponding to the first live streaming user and a live streaming area corresponding to the second live streaming user in the game picture video stream

S1023

Capture a live streaming area corresponding to the first live streaming user from the first live streaming video stream, and capture a live streaming area corresponding to the second live streaming user from the second live streaming video stream

S1024

Fuse the captured live streaming area corresponding to the first live streaming user and the captured live streaming area corresponding to the second live streaming user into the game picture video stream to obtain the game video stream

FIG. 6

DATA PROCESSING METHOD AND APPARATUS, DEVICE AND STORAGE MEDIUM

CROSS-REFERENCES TO RELATED APPLICATIONS

This is a National Stage Application, filed under 35 U.S.C. 371, of International Patent Application No. PCT/CN2021/117352, filed on Sep. 9, 2021, which is based on and claims priority to Chinese Patent Application No. 202011156661.5 filed with the China National Intellectual Property Administration (CNIPA) on Oct. 26, 2020, the disclosure of which is incorporated herein by reference in its entirety.

TECHNICAL FIELD

The present application relates to the technical field of live video streaming, for example, to a data processing method and apparatus, a device and a storage medium.

BACKGROUND

With the development of mobile communication technology, various live video streaming applications come into being. The user can access a live video streaming platform through a live video streaming application installed on a terminal device. In one aspect, the user can initiate live video streaming by posting a video stream collected in real-time through the terminal device to the live video streaming platform. In another aspect, the user can also select a live video stream of interest from the live video streaming platform, the live video streaming platform pushes the live video stream selected by the user to the terminal device used by the user, and the live video stream is played on the terminal device. Of course, audio and video interaction between live streaming users or between live streaming users and viewing users can also be achieved through the microphone connection technology.

In the above-mentioned various live video streaming scenes, the video stream of live video streaming is the video stream corresponding to a single live streaming user, and such live video streaming technology limits the content and form of live video streaming.

SUMMARY

In order to solve the problem in the related art that the content and form of live video streaming are limited to the live video streaming technology in the related art, the present application provides a data processing method and apparatus, a device and a storage medium.

In a first aspect, an embodiment of the present application provides a data processing method. The method includes the following steps.

A first live streaming video stream of a first live streaming user and a second live streaming video stream of a second live streaming user are acquired.

The first live streaming video stream and the second live streaming video stream are merged into a game video stream.

The game video stream is sent to a viewing user to live stream a target game.

In a second aspect, an embodiment of the present application provides a data processing apparatus.

The apparatus includes an acquisition module, a merging module and a live streaming module.

The acquisition module is configured to acquire a first live streaming video stream of a first live streaming user and a second live streaming video stream of a second live streaming user.

The merging module is configured to merge the first live streaming video stream and the second live streaming video stream into a game video stream.

The live streaming module is configured to send the game video stream to a viewing user to live stream a target game.

In a third aspect, an embodiment of the present application provides an electronic device. The electronic device includes a processor and a memory.

The memory is configured to store a program for performing the data processing method described above.

The processor is configured to execute the program stored in the memory.

In a fourth aspect, an embodiment of the present application provides a computer-readable storage medium storing a program for performing the data processing method.

BRIEF DESCRIPTION OF DRAWINGS

FIG. 5 is a flowchart of a data processing method according to an embodiment of the present application;

FIG. 6 is a diagram illustrating the merging of a game video stream according to an embodiment of the present application;

DETAILED DESCRIPTION

The present application is described below in detail in conjunction with drawings and embodiments. It is to be understood that the embodiments described herein are intended to explain the present application and not to limit the present application.

In some flows described in the specification and claims of the present application and the preceding drawings, a plurality of operations occurring in a particular order is included, but it is to be clearly understood that these flows may include more or fewer operations and that these operations may be performed sequentially or in parallel.

Figure 1:
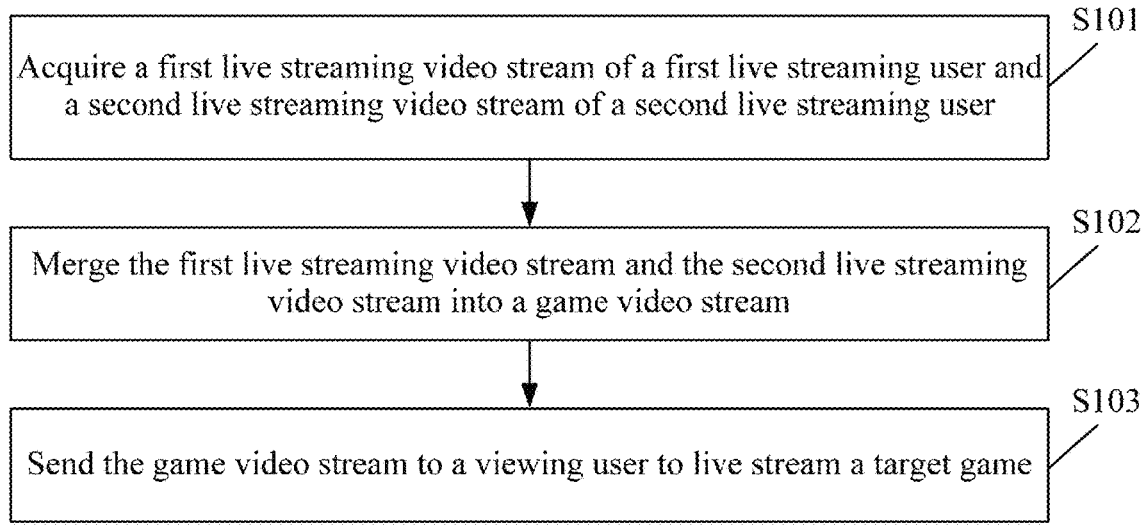
FIG. 1 is a flowchart of a data processing method according to an embodiment of the present application.

As shown in FIG. 1, an embodiment of the present application provides a data processing method. The method includes steps 101, 102 and 103.

In step 101, a first live streaming video stream of a first live streaming user and a second live streaming video stream of a second live streaming user are acquired.

The first live streaming video stream is a game video stream in which the first live streaming user is streaming the target game live, and the second live streaming video stream is a game video stream in which the second live streaming user is streaming the target game live, that is, the first video stream and the second video stream are two game video streams of the same target game that is played by two live streaming users simultaneously on different terminal devices.

For example, in the present application, the first live streaming video stream of the first live streaming user and the second live streaming video stream of the second live streaming user are acquired after a co-streaming request sent by the first live streaming user or the second live streaming user is received. The co-streaming request includes live streaming user identifiers for co-streaming, that is, a first live streaming user identifier and a second live streaming user identifier, and a live streaming video stream of a live streaming user may be acquired through the corresponding live streaming user identifier.

In step 102, the first live streaming video stream and the second live streaming video stream are merged into a game video stream.

After the first live streaming video stream and the second live streaming video stream are acquired, the target game corresponding to both the first live streaming video stream and the second live streaming video stream is acquired, the live streaming location corresponding to the first live streaming video stream and the live streaming location corresponding to the second live streaming video stream are determined according to the game interface architecture corresponding to the target game, and the first live streaming video stream and the second live streaming video stream are merged into one game video stream according to the live streaming location corresponding to the first live streaming video stream and the live streaming location corresponding to the second live streaming video stream.

Figure 2:
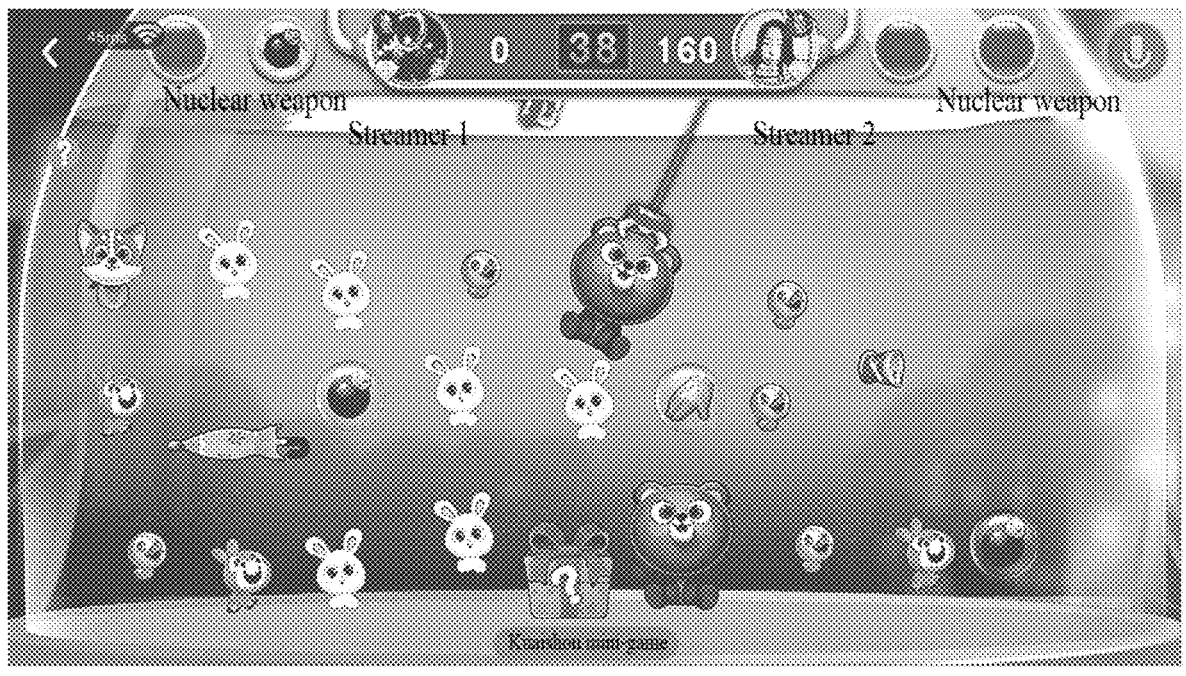
FIG. 2 is a diagram illustrating a game interface according to an embodiment of the present application.

For example, as shown in FIG. 2, if the target game is a gold rush game, the left area of the game live streaming interface may be determined as the first live streaming video stream of the first live streaming user, and the right area may be determined as the second live streaming video stream of the second live streaming user.

In step 103, the game video stream is sent to a viewing user to live stream a target game.

Figure 3:
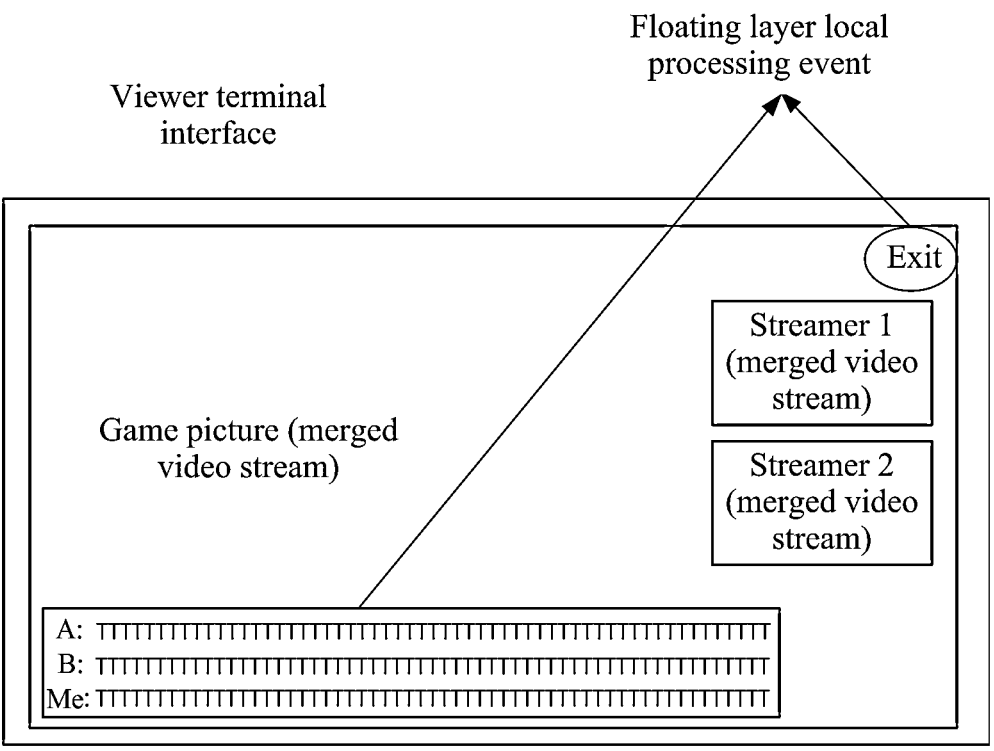
FIG. 3 is a diagram illustrating a viewer terminal interface according to an embodiment of the present application.
Figure 4:
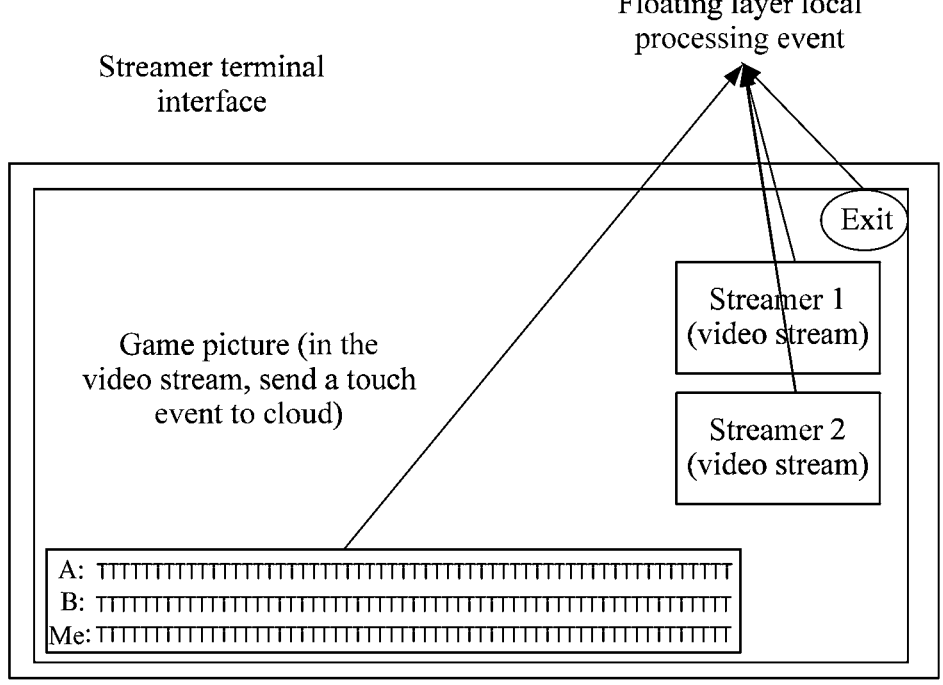
FIG. 4 is a diagram illustrating a viewer terminal interface according to an embodiment of the present application.

It is to be noted that in this embodiment of the present application, a viewing user and live streaming users are involved, and the live streaming content displayed on the terminal device of the viewing user is different from the live streaming content displayed on the terminal device of each live streaming user. In other words, the picture displayed on the terminal device of the viewing user is the game picture in which the first live streaming user and the second live streaming user are co-streaming (as shown in FIG. 3) while the picture displayed on the terminal device of each live streaming user is the game picture of a respective live streaming user (as shown in FIG. 4). That is, the picture displayed on the terminal device of the first live streaming user is the game picture of the first live streaming user, and the picture displayed on the terminal device of the second live streaming user is the game picture of the second live streaming user.

In the data processing method provided in the present application, the first live streaming video stream of the first live streaming user and the second live streaming video stream of the second live streaming user are acquired, the first live streaming video stream and the second live streaming video stream are merged into a game video stream, and the game video stream is sent to the viewing user to live stream the target game. Compared with the fact that the video stream in current live video streaming is the video stream of a single live streaming user, in the present application, the live streaming video streams of different users can be merged and then the merged live streaming video stream can be sent to the viewing user so that the viewing user can simultaneously watch the live streaming content of two live streaming users in one live streaming video stream, thereby enriching the content and form of live video streaming.

As shown in FIG. 5, an embodiment of the present application provides a data processing method. The method includes steps 201, 202 and 203.

In step 201, a first live streaming video stream and a first camera video stream of a first live streaming user and a second live streaming video stream and a second camera video stream of a second live streaming user are acquired.

The first live streaming video stream is a game video stream in which the first live streaming user is streaming the target game, and the second live streaming video stream is a game video stream in which the second live streaming user is streaming the target game. That is, the first video stream and the second video stream are two game video streams of the same target game that is played by two live streaming users simultaneously on different terminal devices.

The first camera video stream is a live streaming video stream of the first live streaming user captured by an installed camera, and the second camera video stream is a live streaming video stream of the second live streaming user captured by an installed camera.

In step 202, the first camera video stream, the second camera video stream, the first live streaming video stream and the second live streaming video stream are merged into a game video stream.

For example, the live streaming location corresponding to the first live streaming video stream and the live streaming location corresponding to the second live streaming video stream are determined according to the game interface architecture corresponding to the target game, the first live streaming video stream and the second live streaming video stream are merged into one game video stream according to the live streaming location corresponding to the first live streaming video stream and the live streaming location corresponding to the second live streaming video stream, and the display location of the first live streaming video stream in the game video stream and the display location of the second live streaming video stream in the game video stream are determined according to requirements. As shown in FIG. 3, the picture of the streamer 1 is the first live streaming video stream, that is, the portrait live streaming video stream of the streamer 1, and the picture of the streamer 2 is the second live streaming video stream, that is, the portrait live streaming video stream of the streamer 2.

It is to be noted that the pictures of the streamer 1 and the streamer 2 in FIG. 3 are embedded in the game video stream, that is, the viewing user cannot turn off the portrait live streaming video streams of the streamer 1 and the streamer 2 on the terminal device of the viewing user. On the terminal device of the live streaming user (as shown in FIG. 4), the live streaming user can turn off the portrait live streaming video streams of the streamer 1 and the streamer 2, that is, the video streams of the streamer 1 and the streamer 2 are floating layer local processing events.

In step 203, the game video stream is sent to a viewing user to live stream a target game.

In the data processing method provided in the present application, the first camera video stream, the second camera video stream, the first live streaming video stream and the second live streaming video stream are merged into a game video stream, and the merged game video stream is sent to the viewing user to live stream the target game. That is, the merged game video stream includes the game video stream and the portrait video stream of the first live streaming user as well as the game video stream and the portrait video stream of the second live streaming user so that the content of live video streaming can further enriched through the present application, thereby improving the usage experience of the viewing user.

As shown in FIG. 6, in an embodiment provided in the present disclosure, the step where the first live streaming video stream and the second live streaming video stream are merged into a game video stream includes steps 1021, 1022, 1023 and 1024.

In step 1021, a game picture video stream is acquired from a server of the target game.

The game picture video stream includes a game operation area, the first live streaming user and the second live streaming user share the game operation area, the game operation area includes multiple game operation tools, and the first live streaming user and the second live streaming user may share the tools in the game operation area.

For example, if the target game is a competitive game, the method further includes: a first game operation area corresponding to the first live streaming user is captured from the first live streaming video stream, and a second game operation area corresponding to the second live streaming user is captured from the second live streaming video stream; and the game operation area is determined according to the first game operation area and the second game operation area. It is to be noted that if the target game is a competitive game, due to the difference between the game operations of the first live streaming user and the game operations of the second live streaming user, the game tools generated correspondingly to different live streaming users are different. Therefore, in the present application, the first game operation area corresponding to the first live streaming user needs to be captured from the first live streaming video stream, the second game operation area corresponding to the second live streaming user needs to be captured from the second live streaming video stream, and the game operation area is determined according to the first game operation area and the second game operation area. That is, the determined game operation area includes both the game operation tools used by the first live streaming user and the game operation tools used by the second live streaming user.

In step 1022, a live streaming area corresponding to the first live streaming user and a live streaming area corresponding to the second live streaming user in the game picture video stream are determined.

In step 1023, the live streaming area corresponding to the first live streaming user is captured from the first live streaming video stream, and the live streaming area corresponding to the second live streaming user is captured from the second live streaming video stream.

In step 1024, the captured live streaming area corresponding to the first live streaming user and the captured live streaming area corresponding to the second live streaming user are fused into the game picture video stream to obtain the game video stream.

Figure 7:
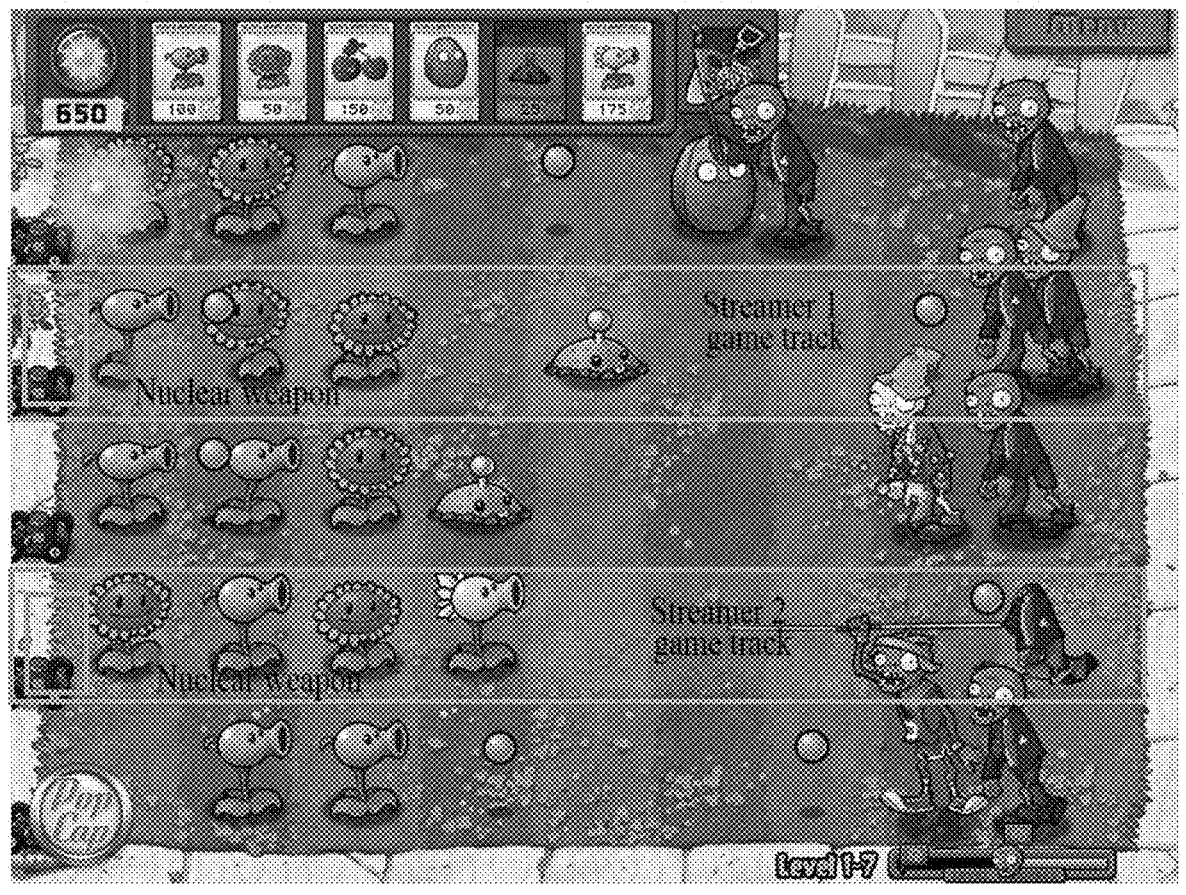
FIG. 7 is a diagram illustrating a game interface according to an embodiment of the present application.

In the merged game video stream as shown in FIG. 7, the game track of the streamer 1 is the live streaming area of the first live streaming user, the game track of the streamer 2 is the live streaming area of the second live streaming user, and the rest content in the figure is the game picture video stream. That is, the game video stream of the first live streaming user and the game video stream of the second live streaming user are embedded in the game picture video stream.

Figure 8:
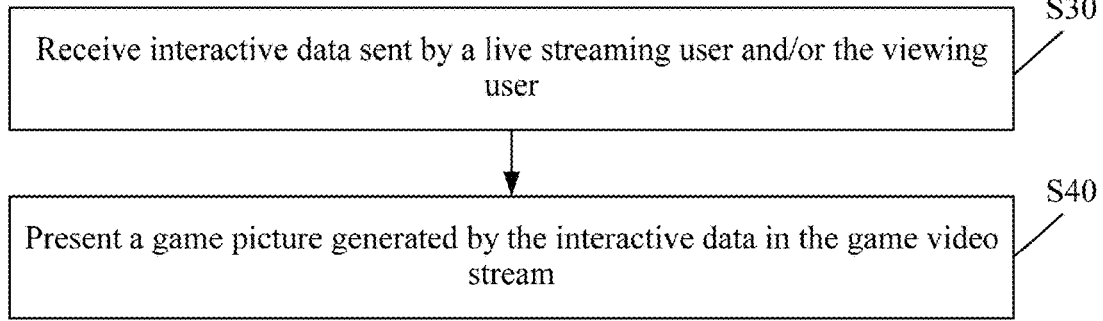
FIG. 8 is a flowchart of a data processing method according to an embodiment of the present application.

As shown in FIG. 8, in an embodiment provided in the present application, after step 203 or step 103, the method further includes steps 30 and 40.

In step 30, interactive data sent by a live streaming user and/or the viewing user is received.

The interactive data is generated according to a target interactive event triggered by a terminal device. The interactive data may specifically be text data, voice data, image data or the like or may be a virtual gift that a viewing user gives to a live streaming user, and the interactive data is not specifically limited to the embodiments of the present application.

In step 40, a game picture generated by the interactive data is presented in the game video stream. As shown in FIG. 3 or FIG. 4, the contents in the dialog box at the bottom of the figure are the interactive data sent by the live streaming user and/or the viewing user.

In an embodiment provided in the present application, the interactive data may specifically be a like or a gift given by the viewing user to the live streaming user, that is, after the live streaming user receives likes or gifts from the viewing user, the live streaming user may improve his game competitiveness (such as capabilities to purchase game tools, skins and the like) according to the number of likes or the number of gifts.

In the embodiments of the present application, the online game implementation technology is introduced into live video streaming. Since various terminal devices exist and these terminal devices have different processing performance, in order to introduce the online game into live video streaming, the online game may be implemented based on the cloud game technology. The terminal device only needs to run a player to obtain the powerful processing performance of a cloud game host, thereby achieving richer live streaming interactive effects.

Figure 9:
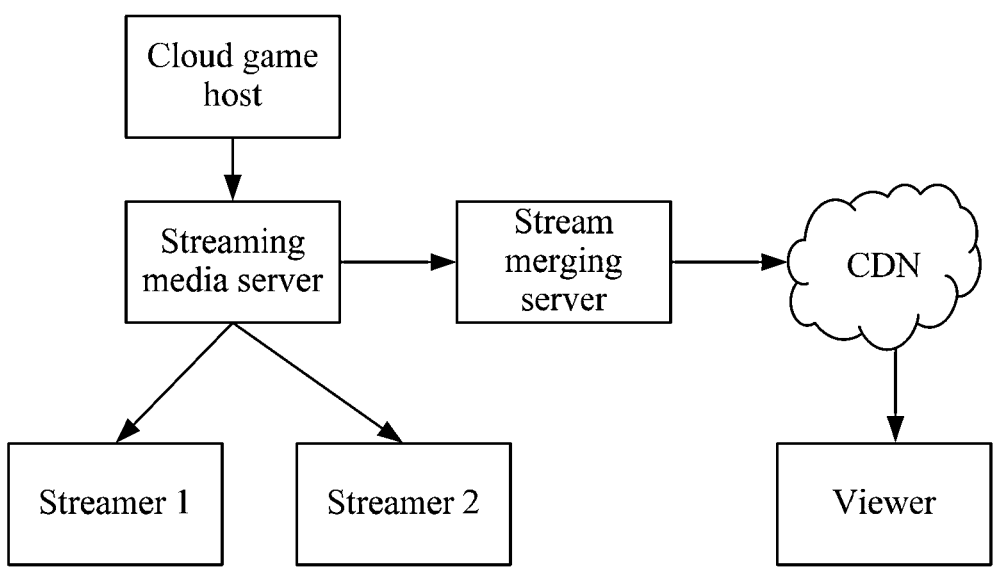
FIG. 9 is a diagram illustrating a network architecture according to an embodiment of the present application.

The network architecture of live video streaming introduced with the cloud game technology is shown in FIG. 9. In FIG. 9, the terminal device used by a live streaming user communicates data with the cloud game host through the streaming media server, the streaming media server further transmits a game data stream and a live streaming video stream to the stream merging server, and the stream merging server merges multiple channels of video streams (including game data streams) and then transmits the merged video stream to the terminal device used by the viewing user through the content delivery network (CDN). If the terminal device of the viewing user interacts with the terminal device of the live streaming user through microphones, the terminal device of the viewing user notifies the cloud game host of the operations for the online game through the content delivery network.

The streaming media server may be a single server or a distributed server system (for example, a server cluster, a cloud server and the like).

It is to be noted that FIG. 9 is an example of the network architecture provided in the embodiments of the present application. In actual application, the online game-related data such as a game data stream and a game control instruction sent by the terminal device of the live streaming user may not be transmitted through the streaming media server, but may be transmitted through other network devices. Interactive operations of the viewing user may not be transmitted through the content delivery network, but may be notified to the cloud game host through other network devices. In addition, in order to achieve data transmission and communication, other network devices may be used in addition to those shown in FIG. 9, such an operation is apparent to those skilled in the art, and details will not be repeated herein.

In practical application, the display screen of the terminal device displays a first live video streaming interface. In one implementation, a control for creating live streaming is displayed on the first live video streaming interface, the control for creating live streaming is triggered by a live streaming user, a live streaming mode selection window pops up on the first live video streaming interface, a control for creating cloud game live streaming is displayed in the window, the control for creating cloud game live streaming is triggered by the live streaming user, and a target trigger event occurs. In another implementation, a control for creating cloud game live streaming is displayed on the first live video streaming interface, the control is triggered by a live streaming user, and a target trigger event occurs. In another implementation, a live streaming user has already created a live streaming video, the live streaming video is displayed on a first live video streaming display interface, a control for creating cloud game live streaming is further displayed on the first live video streaming display interface, the control is triggered by the live streaming user, and a target trigger event occurs.

In the method provided in the embodiments of the present application, the target game task may be created by a terminal device of another live streaming user connected to the current terminal device through microphones.

For example, a game task creation request is sent to the cloud game host through the streaming media server.

On the basis of any of the preceding method embodiments, the preceding game data stream may be received through the streaming media server.

On the basis of any of the preceding method embodiments, the target game control instruction may be sent to the cloud game host through the streaming media server.

The streaming media server used for live video streaming has the characteristics of being distributed, and in the process of data transmission, the terminal device is allocated a closer or idle streaming media server to transmit data to ensure the efficiency and reliability of data transmission, thereby improving the performance of live video streaming. After the online game is introduced, the game-related data is also transmitted through the streaming media server. In this manner, in one aspect, no extra data transmission network is required to be established, and in another aspect, the data transmission advantages of the streaming media server are utilized.

On the basis of any of the preceding method embodiments, the interactive data may include target game resource generation data, and accordingly, the game control instruction may include a target game resource usage instruction.

The specific implementation method for performing online game live streaming in live video streaming through the cooperation of various devices is described below in conjunction with specific application scenarios.

In Scenario 1, microphone connection is established between the live streaming user 1 and the live streaming user 2. The camera of the first terminal device of the live streaming user 1 collects a first video stream in real-time; the first video stream is displayed on the first live streaming video display interface (the display interface of the live streaming user 1), and meanwhile, the first video stream is sent to a streaming media server; the streaming media server sends the first video stream to the second terminal device of the live streaming user 2; and the second terminal device displays the first video stream on the second live streaming video display interface (the display interface of the live streaming user 2). The camera of the second terminal device of the live streaming user 2 collects a second video stream in real-time; the second video stream is displayed on the second live streaming video display interface (the display interface of the live streaming user 2), and meanwhile, the second video stream is sent to the streaming media server; the streaming media server sends the second video stream to the first terminal device of the live streaming user 1; and the first terminal device displays the second video stream on the first live streaming video display interface (the display interface of the live streaming user 1).

The live streaming user 1 (the first terminal device) initiates a Player Killing (PK) request to the live streaming user 2 for requesting to perform a PK within a first game with the live streaming user 2. A network device (which may be a streaming media server or another server) forwards the PK request to the live streaming user 2 (the second terminal device). If the live streaming user 2 agrees to perform the PK, the live streaming user 2 returns a response indicating consent, and the response is returned to the first terminal device. The first terminal device sends a first game creation instruction (that is, a creation instruction of the preceding target game) to a cloud game host through the streaming media server. The cloud game host creates a first game task according to the first game creation instruction and starts to push the game data stream of the first game. The streaming media server sends the game data stream to the first terminal device, the second terminal device and a stream merging server, respectively. The stream merging server receives a first live streaming game video stream of the live streaming user 1 and a second live streaming game video stream of the live streaming user 2, performs merging processing on the first live streaming game video stream, the second live streaming game video stream, the first video stream and the second video stream, and sends the video stream merged after the merging processing to a content delivery network. The content delivery network sends the merged video stream to the interactive terminal device of a corresponding viewing user.

As shown in FIG. 4, the streamer terminal interface displays a game picture generated based on the game data stream in a first display area of the video stream display interface, displays the first video stream in a second display area of the first video stream display interface, displays the second video stream in a third display area of the first video stream display interface, and may further display a text dialog box in a fourth display area of the first video stream display interface. As shown in FIG. 3, the viewer terminal interface displays the merged video stream in a first display area of the video stream display interface and may display a text dialog box in a second display area. Both the live streaming user 1 and the live streaming user 2 are game participants of the first game, and they initiate game control instructions through the first terminal device and the second terminal device, drive the game process and perform the PK within the first game. In the process of the game, the viewing user may select one of the live streaming users to established the microphone connection and deliver the game equipment or game props (game resources) to the connected live streaming user. Accordingly, the interactive terminal responds to the operation of the viewing user, triggers a target interactive event (giving the game props to the connected live streaming user) and sends an interactive request to the game host. The game host generates a game prop for the corresponding live streaming user according to the interactive request and sends the game prop data (game resource generation data) and the game data stream so that the live streaming user can use the game prop.

In Scenario 2, the live streaming user 1 initiates live video streaming. The camera of first terminal device of the live streaming user 1 collects the first video stream in real-time. The first video stream is displayed on the first live streaming video display interface and meanwhile, the first video stream is sent to the streaming media server. The streaming media server sends the first video stream to the stream merging server, and the streaming server sends the first video stream to the CDN. The CDN sends the first video stream to the interactive terminal of the viewing user. The viewing user is connected to the first terminal of the live streaming user 1 by means of microphone connection through the interactive terminal. The first terminal sends a second game creation instruction (that is, the creation instruction of the preceding target game) to the cloud game host through the streaming media server in the process of live video live streaming. The cloud game host creates a second game task according to the second game creation instruction and starts to push the game data stream of the second game. The streaming media server sends the game data stream to the first terminal device and the stream merging server, respectively. The stream merging server performs merging processing on the game data stream and the first video stream and sends the video stream merged after the merging processing to the content delivery network. The content delivery network sends the merged video stream to the interactive terminal device of the corresponding viewing user. The first terminal device displays a game picture generated based on the game data stream in the first display area of the first video stream display interface, displays the first video stream in the second display area of the first video stream display interface, and may further display a text dialog box in the fourth display area of the first video stream display interface. The viewing user displays the merged video stream in a first display area of the second video stream display interface and may display a text dialog in a second display area. The first terminal initiates a game invitation to the interactive terminal, and the interactive terminal accepts the game invitation to enter the second game. Meanwhile, both the live streaming user 1 and the viewing user are game participants of the first game, and they initiate game control instructions through the first terminal device and the interactive terminal device and drive the game process.

It is to be understood that the serial numbers of steps in the preceding embodiments do not mean the execution sequence of the steps, and the execution sequence of various processes should be determined according to their functions and internal logic and is not intended to limit the implementation process of the embodiments of the present application.

Figure 10:
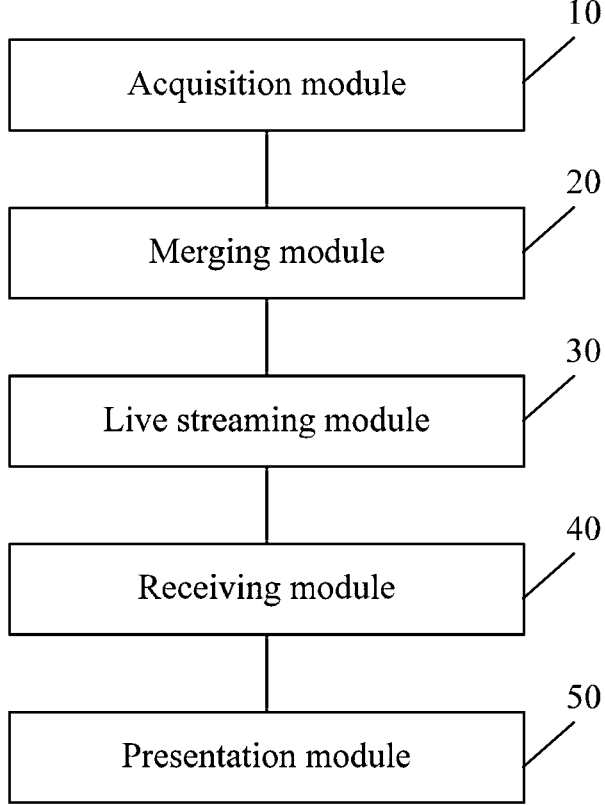
FIG. 10 is a block diagram of a data processing apparatus according to an embodiment of the present application.

In an embodiment, a data processing apparatus is provided. The data processing apparatus is in one-to-one correspondence with the data processing methods in the preceding embodiments. As shown in FIG. 10, various functional modules of the data processing apparatus are described below in detail.

An acquisition module 10 is configured to acquire a first live streaming video stream of a first live streaming user and a second live streaming video stream of a second live streaming user.

A merging module 20 is configured to merge the first live streaming video stream and the second live streaming video stream into a game video stream.

A live streaming module 30 is configured to send the game video stream to a viewing user to live stream a target game.

For example, the acquisition module 10 is further configured to acquire a first camera video stream of the first live streaming user and a second camera video stream of the second live streaming user.

The merging module 20 is further configured to merge the first camera video stream, the second camera video stream, the first live streaming video stream and the second live streaming video stream into a game video stream.

For example, the apparatus further includes a receiving module 40 and a presentation module 50.

The receiving module 40 is configured to receive interactive data sent by a live streaming user and/or the viewing user, where the interactive data is generated according to a target interactive event triggered by an interactive terminal device.

The presentation module 50 is configured to present a game picture generated by the interactive data in the game video stream.

For example, the merging module 20 includes an acquisition unit, a determination unit, a capture unit and a merging unit.

The acquisition unit is configured to acquire a game picture video stream from a server of the target game.

The determination unit is configured to determine a live streaming area corresponding to the first live streaming user and a live streaming area corresponding to the second live streaming user in the game picture video stream.

The capture unit is configured to capture a live streaming area corresponding to the first live streaming user from the first live streaming video stream and capture a live streaming area corresponding to the second live streaming user from the second live streaming video stream.

The merging unit is configured to merge the captured live streaming area corresponding to the first live streaming user and the captured live streaming area corresponding to the second live streaming user into the game picture video stream to obtain the game video stream.

For example, the game picture video stream includes a game operation area, and the first live streaming user and the second live streaming user share the game operation area.

For example, if the target game is a competitive game, the capture unit is further configured to capture a first game operation area corresponding to the first live streaming user from the first live streaming video stream and capture a second game operation area corresponding to the second live streaming user from the second live streaming video stream.

The determination unit is further configured to determine the game operation area according to the first game operation area and the second game operation area.

For the specific definition of the data processing apparatus, reference may be made to the definition of the preceding data processing method, and details will not be repeated herein. Various modules in the preceding apparatus may be implemented, in whole or in part, in software, hardware and combinations thereof. The preceding modules may be embedded in or independent of a processor in a computer device in the form of hardware or may be stored in a memory in the computer device in the form of software so that the processor can call and execute operations corresponding to each of the preceding modules.

Figure 11:
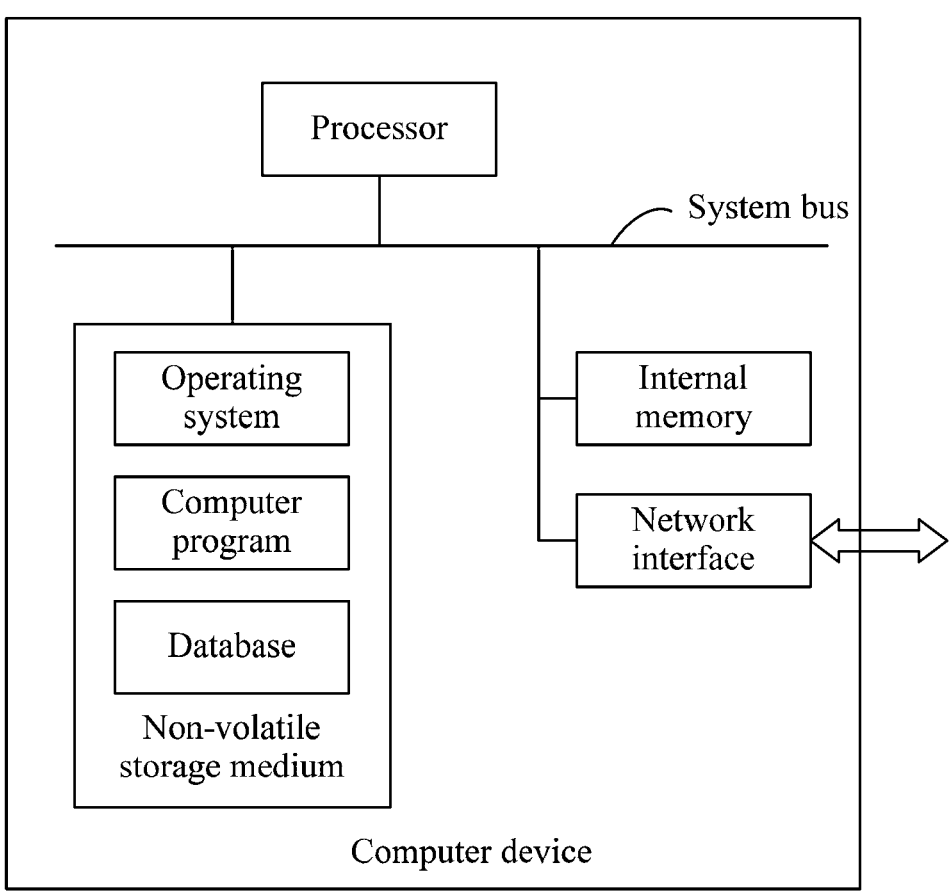
FIG. 11 is a diagram illustrating a computer device according to another embodiment of the present application.

In an embodiment, a computer device is provided. The computer device may be a server, and the internal structure diagram of the computer device may be shown in FIG. 11. The computer device includes a processor, a memory, a network interface and a database which are connected via a system bus. The processor of the computer device is configured to provide computing and control capabilities. The memory of the computer device includes a non-volatile storage medium and an internal memory. The non-volatile storage medium stores an operating system, a computer program and a database. The internal memory provides an environment for the operation of the operating system and the execution of the computer program in the non-volatile storage medium. The network interface of the computer device is configured to communicate with an external terminal through a network connection. The computer program, when executed by the processor, performs a data processing method.

In an embodiment, a computer device is provided. The computer device includes a memory, a processor, and a computer program stored in the memory and executable by the processor. The processor executes the computer program to perform the steps described below.

A first live streaming video stream of a first live streaming user and a second live streaming video stream of a second live streaming user are acquired.

The first live streaming video stream and the second live streaming video stream are merged into a game video stream.

The game video stream is sent to a viewing user to live stream a target game.

In an embodiment, a computer-readable storage medium is provided. The computer-readable storage medium is configured to store a computer program, and the computer program, when executed by a processor, performs the steps described below.

A first live streaming video stream of a first live streaming user and a second live streaming video stream of a second live streaming user are acquired.

The first live streaming video stream and the second live streaming video stream are merged into a game video stream.

The game video stream is sent to a viewing user to live stream a target game.

It is to be understood by those of ordinary skill in the art that all or part of the procedure steps in the methods of the preceding embodiments may be implemented by related hardware instructed by computer programs, these computer programs may be stored in a non-volatile computer-readable storage medium, and during the execution of these programs, the procedure steps in the methods of the preceding embodiments may be implemented. All references to the memory, storage, database or other media used in the various embodiments provided in the present application may each include a non-volatile and/or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache. By way of illustration but not limitation, various forms of RAMs may be used, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SL- DRAM), a Rambus direct RAM (RDRAM), a direct Rambus dynamic RAM (DRDRAM), a Rambus dynamic RAM (RDRAM), and the like.

It is to be clearly understood by those skilled in the art that for convenience and conciseness of description, the division of the preceding functional units and modules is for illustration. In practical application, the preceding functions may be distributed and performed by different functional units and modules according to needs, that is, the internal structure of the apparatus is divided into different functional units or modules to perform all or part of the preceding functions.

What is claimed is:

1. A data processing method, performed by a stream merging server, comprising:

acquiring a first live streaming video stream of a first live streaming user and a second live streaming video stream of a second live streaming user from a streaming media server;

wherein the first live streaming video stream and the second live streaming video streams are real-time video streams of a same target game from different terminal devices;

merging the first live streaming video stream and the second live streaming video stream into a game video stream, comprising:

acquiring a game picture video stream of the target game from a cloud game host;

determining a first live streaming area corresponding to the first live streaming user and a second live streaming area corresponding to the second live streaming user in the game picture video stream according to a game interface architecture of the target game;

capturing content corresponding to the first live streaming area from the first live streaming video stream, and capturing content corresponding to the second live streaming area from the second live streaming video stream; and fusing the captured content corresponding to the first live streaming area into the first live streaming area of the game picture video stream, and fusing the captured content corresponding to the second live streaming area into the second live streaming area of the game picture video stream to obtain the game video stream; and sending the game video stream via a content delivery network (CDN) to a viewing user to live stream the target game.

2. The data processing method according to claim 1, further comprising:

acquiring a first camera video stream of the first live streaming user and a second camera video stream of the second live streaming user; and merging the first camera video stream, the second camera video stream, the first live streaming video stream and the second live streaming video stream into a game video stream.

3. The data processing method according to claim 2, further comprising:

receiving interactive data sent by at least one of a live streaming user and the viewing user, wherein the interactive data is generated according to a target interactive event triggered by an interactive terminal device; and presenting a game picture generated by the interaction data in the game video stream.

4. The data processing method according to claim 1, further comprising:

receiving interactive data sent by at least one of a live streaming user and the viewing user, wherein the interactive data is generated according to a target interactive event triggered by an interactive terminal device; and presenting a game picture generated by the interaction data in the game video stream.

5. The data processing method according to claim 4, wherein the game picture video stream comprises a game operation area, and the first live streaming user and the second live streaming user share the game operation area.

6. The data processing method according to claim 4, wherein in a case where the target game is a competitive game, the method further comprises:

capturing a first game operation area corresponding to the first live streaming user from the first live streaming video stream, and capturing a second game operation area corresponding to the second live streaming user from the second live streaming video stream; and determining the game operation area according to the first game operation area and the second game operation area.

7. An electronic device, comprising a processor and a memory;

wherein the memory is communicatively connected to the processor, the memory has instructions executable by the processor stored thereon, and the instructions are used for performing a data processing method, wherein the data processing method comprises:

acquiring a first live streaming video stream of a first live streaming user and a second live streaming video stream of a second live streaming user from a streaming media server;

wherein the first live streaming video stream and the second live streaming video streams are real-time video streams of a same target game from different terminal devices;

merging the first live streaming video stream and the second live streaming video stream into a game video stream, comprising:

acquiring a game picture video stream of the target game from a cloud game host;

determining a first live streaming area corresponding to the first live streaming user and a second live streaming area corresponding to the second live streaming user in the game picture video stream according to a game interface architecture of the target game;

capturing content corresponding to the first live streaming area from the first live streaming video stream, and capturing content corresponding to the second live streaming area from the second live streaming video stream; and fusing the captured content corresponding to the first live streaming area into the first live streaming area of the game picture video stream, and fusing the captured content corresponding to the second live streaming area into the second live streaming area of the game picture video stream to obtain the game video stream; and sending the game video stream via a content delivery network (CDN) to a viewing user to live stream the target game.

8. The electronic device according to claim 7, further comprising:

acquiring a first camera video stream of the first live streaming user and a second camera video stream of the second live streaming user; and merging the first camera video stream, the second camera video stream, the first live streaming video stream and the second live streaming video stream into a game video stream.

9. The electronic device according to claim 7, further comprising:

receiving interactive data sent by at least one of a live streaming user and the viewing user, wherein the interactive data is generated according to a target interactive event triggered by an interactive terminal device; and presenting a game picture generated by the interaction data in the game video stream.

10. The electronic device according to claim 9, wherein the game picture video stream comprises a game operation area, and the first live streaming user and the second live streaming user share the game operation area.

11. The electronic device according to claim 9, wherein in a case where the target game is a competitive game, the method further comprises:

capturing a first game operation area corresponding to the first live streaming user from the first live streaming video stream, and capturing a second game operation area corresponding to the second live streaming user from the second live streaming video stream; and determining the game operation area according to the first game operation area and the second game operation area.

12. A non-transitory computer-readable storage medium storing a program for performing a data processing method, wherein the data processing method comprises:

acquiring a first live streaming video stream of a first live streaming user and a second live streaming video stream of a second live streaming user from a streaming media server; wherein the first live streaming video stream and the second live streaming video streams are real-time video streams of a same target game from different terminal devices;

merging the first live streaming video stream and the second live streaming video stream into a game video stream, comprising:

acquiring a game picture video stream of the target game from a cloud game host;

determining a first live streaming area corresponding to the first live streaming user and a second live streaming area corresponding to the second live streaming user in the game picture video stream according to a game interface architecture of the target game;

capturing content corresponding to the first live streaming area from the first live streaming video stream, and capturing content corresponding to the second live streaming area from the second live streaming video stream; and fusing the captured content corresponding to the first live streaming area into the first live streaming area of the game picture video stream, and fusing the captured content corresponding to the second live streaming area into the second live streaming area of the game picture video stream to obtain the game video stream; and sending the game video stream via a content delivery network (CDN) to a viewing user to live stream the target game.

13. The non-transitory computer-readable storage medium according to claim 10, further comprising:

acquiring a first camera video stream of the first live streaming user and a second camera video stream of the second live streaming user; and merging the first camera video stream, the second camera video stream, the first live streaming video stream and the second live streaming video stream into a game video stream.

14. The non-transitory computer-readable storage medium according to claim 12, further comprising:

receiving interactive data sent by at least one of a live streaming user and the viewing user, wherein the interactive data is generated according to a target interactive event triggered by an interactive terminal device; and presenting a game picture generated by the interaction data in the game video stream.

\* \* \* \* \*